May 12, 1959  W. S. FRAULA ET AL  2,885,731
MOLDING PRESS FOR BRAKE LININGS
Filed March 5, 1957  3 Sheets-Sheet 1
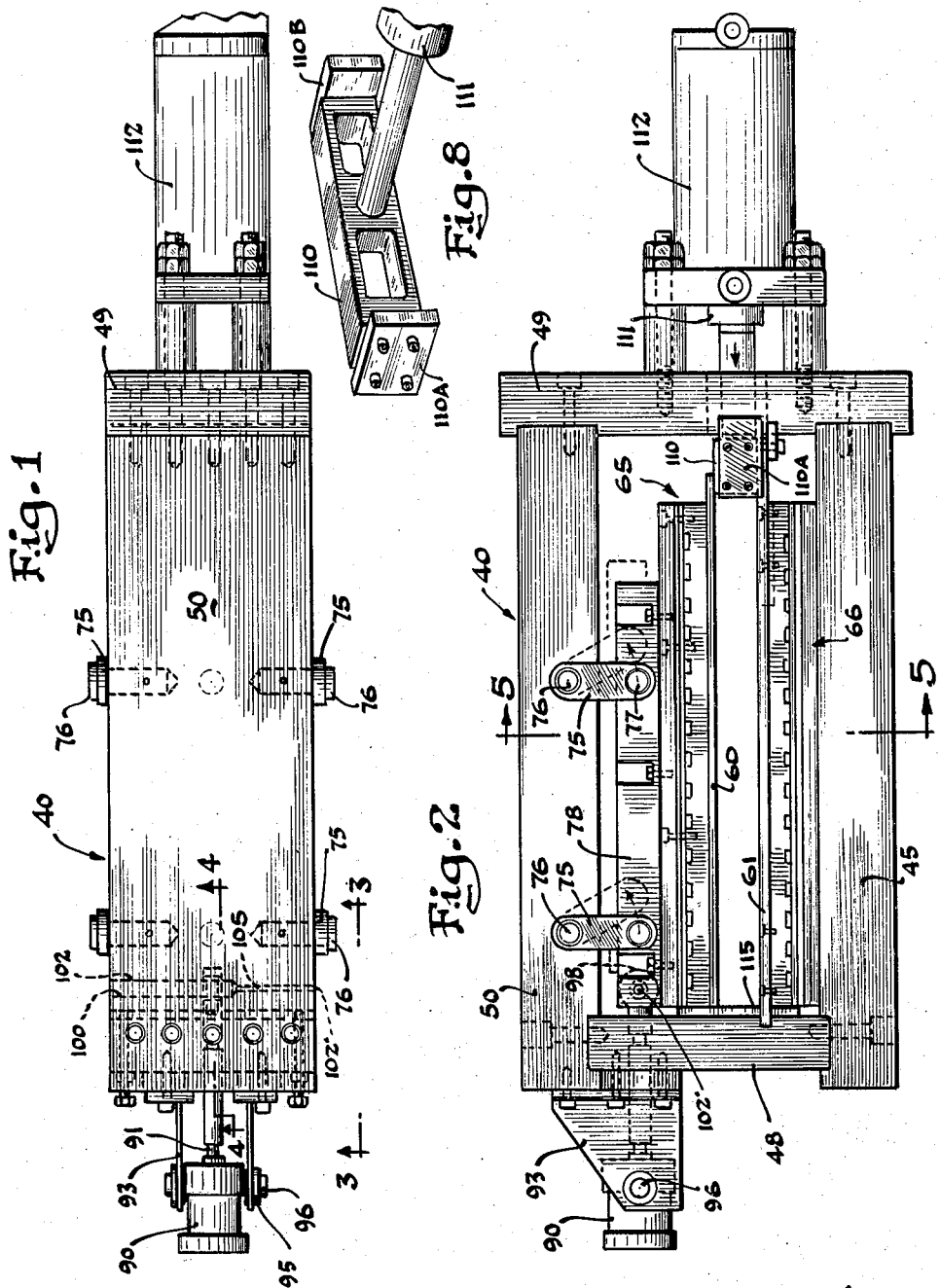
Inventors
William S. Fraula
Walter J. Olson
By Wallace and Cannon
Attorneys

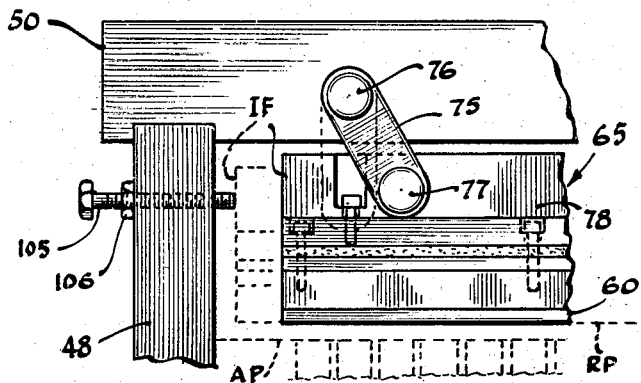
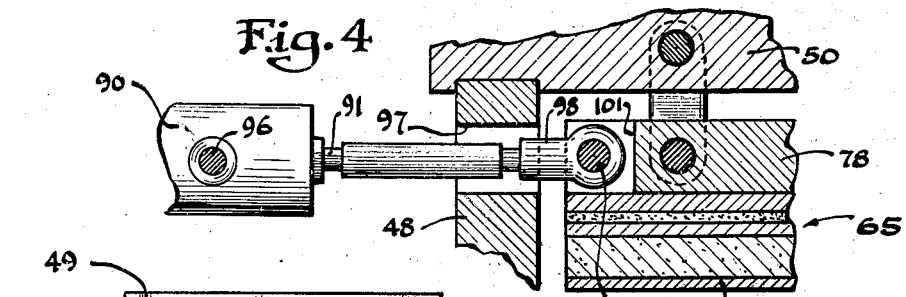
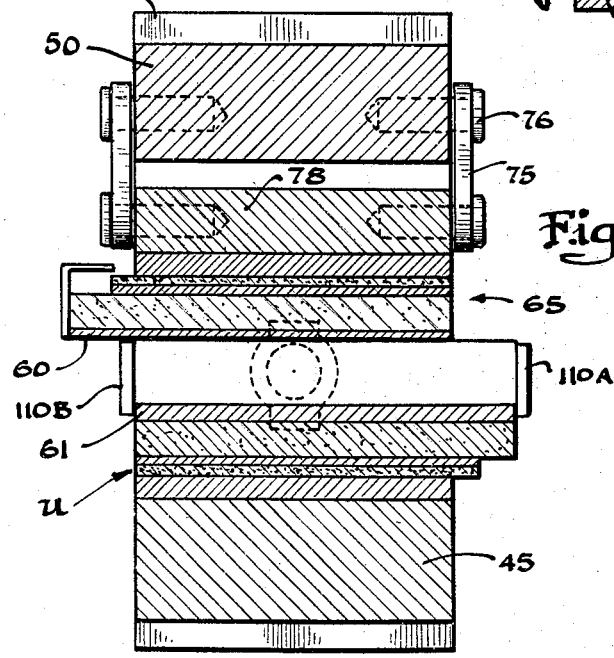
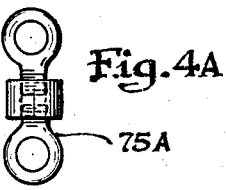

May 12, 1959

W. S. FRAULA ET AL 2,885,731

MOLDING PRESS FOR BRAKE LININGS

Filed March 5, 1957

Inventors
William S. Fraula
Walter J. Olson

By  Wallace and Cannon

Attorneys

United States Patent Office 2,885,731
Patented May 12, 1959

2,885,731

MOLDING PRESS FOR BRAKE LININGS

William S. Fraula, Ridgewood, and Walter J. Olson, Packanack Lake, N.J., assignors to American Brake Shoe Company, New York, N.Y., a corporation of Delaware Application March 5, 1957, Serial No. 644,033

6 Claims. (Cl. 18—16)

This invention relates to a press for the production of composition friction elements, specifically in the form of brake linings.

In the production of composition friction elements in the form of brake linings or the like it is conventional to first produce so-called pre-forms, that is, the dry mixed composition material for the brake lining including asbestos and other fillers together with a thermosetting resin is first pressed, partially cured and then shaped in the desired arcuate form prior to a complete curing cycle on the pre-form linings under heat and pressure in a press. In accordance with the present invention, a plurality of such brake lining pre-forms are arranged one by one in complemental die cavities in a multi-chambered die member, and this die member is then subjected to heat and pressure during advancement and cure of the pre-form brake linings to a final useful stage. As will be explained below, the aforementioned multi-chambered die member is of an expandable type so that the individual brake lining pre-forms can be inserted in respective die cavities, and at the commencement of the curing cycle the die member is contracted in the press. One of the important objects of the present invention is to assure that the die member contracts equally on all sides thereby assuring that each brake lining will have a uniform cross-section throughout, and it will be appreciated that a brake lining of significant non-uniform cross-section is unacceptable.

The press entailed is one that embodies a pair of spaced platens adapted to exert at best but slight pressure on the aforementioned die member in a direction normal to the pressure used to contract the die. The pressure applied by the platen is thus more or less a confining pressure, since what the platens do in effect is close off opposite sides of the individual die chambers in the master die member. It is therefore an advantage to maintain the platens closed on the die members with what may be termed a minimum degree of pressure, since this accomplishes the desired end and assures the least amount of wear on the die member as well as the platens.

Another object of the present invention is to enable such minimum contact between the platens and the die member to be attained in all instances and with predetermined accuracy.

It is essential in the production of satisfactory brake linings to assure that the brake linings do not come in contact with oil or like fluids, since oil or the like would detract materially from the friction characteristics of the brake lining. In fact it might be said that this is one of the more serious considerations in the production of brake linings. It will be recognized that in those instances where a press of the kind under consideration utilizes hydraulic cylinders as the pressure establishing means, the possibility of exposure of the brake linings to oil occurs particularly where there is a likelihood of gravity flow of oil leaking from the cylinders in the direction of the die member. However, hydraulic cylinders are the most acceptable mode of pressure application because of the high degree of precision adjustment afforded, and another object of the persent invention is to enable the aforementioned platens to be closed vertically on the die member by hydraulic means operating horizontally rather than with a vertical stroke.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying equivalent principles may be used and structural changes may be made as desired by those skilled in the art without departing from the present invention and the purview of the appended claims.

In the drawings:

Fig. 1 is a top plan view of the press of the present invention;

Fig. 2 is a front elevation of the press shown in Fig. 1;

Fig. 3 is a fragmentary view on an enlarged scale of a portion of the press shown in Fig. 2 and being taken substantially on the line 3—3 of Fig. 1;

Fig. 4 is a sectional view taken substantially on the line 4—4 of Fig. 1, and showing the upper platen in its lowermost position;

Fig. 4A shows a modified link;

Fig. 5 is a sectional view taken substantially on the line 5—5 of Fig. 2;

Fig. 8 is a partial perspective view of the ram used to apply pressure normal to the closing direction of the platens of the press.

As is well known, brake linings of the type used in automotive vehicles, busses, trucks and the like, are conventionally made of composition material including asbestos or the like, finely divided friction enhancing material and other suitable fillers together with an organic binder of the thermosetting resin type. The usual practice is to have all the materials from which the brake lining is to be made in finely divided fluff form including the resin binder in an early stage of cure and growth. The dry mix is sprinkled in a suitable cavity and then is pressed to a self-sustaining condition under conditions which cause the resin to slightly advance. What is produced in many instances is simply what appears as a pressed board, but whatever the shape of the preliminary dry mix article produced in accordance with the foregoing, the same is usually next shaped on a mandrel so as to assume an arcuate form and individual brake lining pre-forms of arcuate shape are then sawed therefrom.

Figure 6:
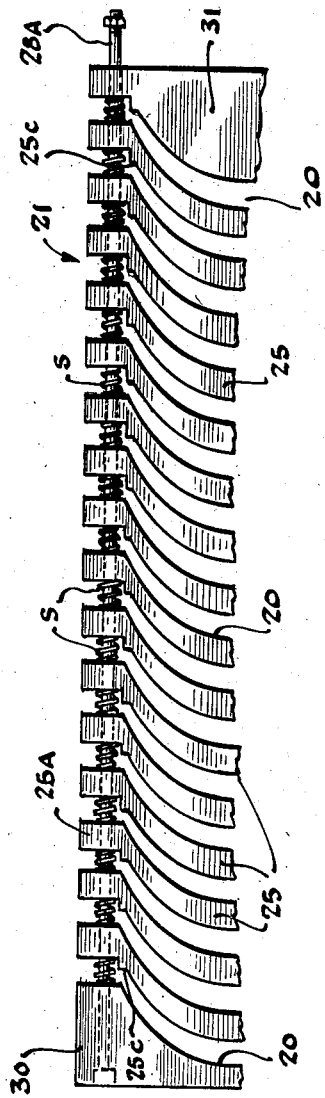
Fig. 6 is a fragmentary top plan view of the die member in its expanded and unloaded state.
Figure 7:
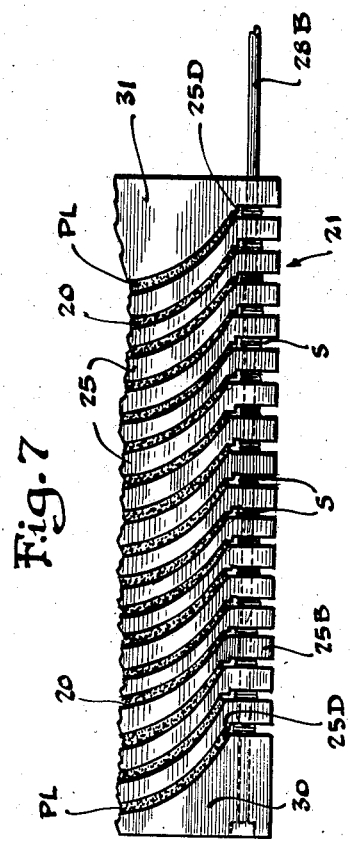
Fig. 7 is a fragmentary view of the die member in its contracted state.

Under the present invention, and referring to Figs. 6 and 7 of the drawings, these individual brake lining pre-forms are adapted to be individually set in individual die chambers 20 afforded by a die member 21. The die member 21 is of an expandable and contractable nature as will be explained and includes a plurality of individual die elements 25 which are so shaped as to define the limits of the arcuate die chambers 20. Thus each die element 25 is in the form of an arcuately shaped block, and at either end each die element is formed with an integral ear 25A and 25B each of which is bored to permit the individual die element to be assembled as a set on a pair of parallel elongated mounting rods 28A and 28B. At one end, the die member 21 includes a rigid reaction block or base member 30 in which heads of the rods 28A and 28B are disposed, and at the opposite end the die member includes a pressure applying member in the form of a plunger or movable head 31.

In order to properly space and maintain the die elements 25 normally in open or expanded condition as shown in Fig. 6, expansion means in the form of springs S are mounted concentrically on the rods 28A and 28B between the ears 25A and 25B of adjacent die elements. Nuts are threadedly mounted on the ends of the rods 28A and 28B that are outwardly of the plunger 31.

As shown in Fig. 7 pre-form linings PL are adapted to be mounted in the individual die cavities 20, and this is accomplished at a time when the die member 21 is in its expanded state shown in Fig. 6. It will be appreciated of course that the die member 21 while being loaded is disposed on a horizontal surface so that the individual die cavities open upwardly as shown in Fig. 6. In order to contract the die cavities to the state shown in Fig. 7, pressure is applied to the plunger 31. This occurs in the press as will be explained below, and it should be mentioned that each die element is formed with spaced end ledges or shoulders 25C and 25D inwardly of the ears 25A and 25B, and the arrangement is such that these shoulders in effect close off the opposite ends of the die cavities as best shown in Fig. 7 when the die member 21 has been fully contracted. This end closure of the die cavities prevents endwise extrusion of the brake linings undergoing final cure under heat and pressure in the press. Much of the foregoing is explained in a copending application Serial No. 441,094, filed on July 2, 1954.

Referring to Figs. 1 and 2 of the drawings, the press of the present invention is illustrated at 40, and as indicated in Fig. 2 a die space is afforded for the die member 21. The press 40 is arranged for floor mounting, but the bench or bed portion of the press is not illustrated herein, which is to say that the drawings are restricted to the aspects of the press which embody details of the present invention. Thus, the upper section of the press includes a horizontal bed slab 45, Fig. 2, which supports a pair of spaced vertical end slabs 48 and 49, and a horizontal head or spacer slab 50 is connected at the respective ends thereof to the upper portions of the vertical slabs 48 and 49. These slab members of the press are rigidly assembled and connected by screws in the usual fashion.

The die space shown in Fig. 2 is defined by the wear plates 60 and 61 included respectively in the upper and lower platens 65 and 66 of the press. The platens 65 and 66 embody conventional heater elements and insulator plates whereby the brake lining pre-forms arranged in the die member 21 and subjected to pressure in the die space can at the same time be subjected to heat of an order predetermined to effect the final cure of the resin binder included in the brake lining composition.

The upper platen 65 is movable so as to be capable of movement between a retracted position, wherein the die space is enlarged beyond the dimensions of the die member 21, and an advanced position wherein the wear plate 60 included in the platen 65 cooperates with the lower wear plate 61 to close on the upper and lower faces of the die member 21 and effectively seal off the die cavities 20 in the die member 21. Thus, relative movement of the platens to what constitutes an open position is desired at the time the die member 21 is to be either disposed in or taken from the die space, and as is well known in the art the press is "bumped" during the course of the cure cycle, which is to say that at predetermined intervals during the course of a cure cycle on composition material of this kind the platens 65 and 66 are in effect opened to enable gases evolved during the course of the resin cure to emit from the die cavities of the die member 21. In order not to adversely wear the upper face of the die member 21, it is advantageous that the platens 65 and 66 be held closed merely with sufficient pressure to assure an effective seal of the die cavities 20, and it is of further advantage in this connection to assure that the movable platen of the press moves accurately in planes which are at all times parallel to the plane of the upper face of the die member 20 disposed in the die space of the press. Moreover, it is of importance that the press be "bumped" for the aforesaid purpose quickly and expeditiously and the advantageous relations thus enumerated are attained under the present invention in the manner now to be explained.

As was mentioned, the upper platen 65 is movable under the present instance between a retracted position indicated by dotted lines in Fig. 2 (and solid lines in Fig. 3) to an advanced or normal position indicated contrariwise shown in Figs. 2 and 3. To this end, the upper platen 65 is suspended pivotally from the head block or slab 50 of the press by links 75, the opposed ends of these links being journaled respectively on pins 76 mounted in the slab 50 and pins 77 mounted in a head plate 78, Fig. 2, included as part of the upper platen 65. It will be seen from this that by so suspending the platen 65, the platen 65 is adapted to swing in progressive parallel planes as can be appreciated from the showing in Figs. 2 and 3, and by accurately dimensioning and locating the links 75 and the pins 76 and 77 it can be assured that the face of the platen 65 represented by the wear plate 60 will be accurately oriented and related to the upper face of the die member 21 disposed in the die space of the press.

The platen 65 is actuated under the present invention by hydraulic means including a cylinder 90, Figs. 1 and 2, and an associated piston 91. As will be observed in Figs. 1 and 2, a pair of brackets 93 are affixed to the head slab 50. These brackets project outwardly from the side of the press, and bushings 95 are mounted in alignment in the outer ends thereof. The housing for the cylinder 90 is provided with trunnions 96 and these are pivotally mounted in the bushings 95 enabling the cylinder to swing as required during vertical movement of the platen 65 in progressive parallel horizontal planes.

An opening 97 is formed in the side block or slab 48 as best shown in Fig. 4, and the piston 91 is extended thereto. As shown further in Fig. 4, an eye connection 98 is secured to the inner or free end of the piston 91, and this serves to connect the piston member 91 to the platen 65. Thus, and as shown in Figs. 1 and 4, an elongated pin 100 has a press fit in the side of the head 78 of the platen 65 adjacent the eye connection 98, and the pin 100 is passed through the opening in the eye connection 98 whereby the piston 91 is pivotally connected to the platen 65. The head 78 of the platen is of course slotted at 101, Fig. 4, normal to the opening in which the pin 100 is mounted enabling the opening in the eye member 98 to be registered with the opening 102, Fig. 1, in the platen head 78 into which the pin 100 is to be inserted. In order that pin 100 can be removed by striking an end thereof, the inner end of the opening 102 communicates with a smaller size aperture 102', Fig. 1, into which a suitable tool can be inserted and tapped to strike the pin 100.

It will be recognized that the aforegoing arrangement enables the cylinder and piston 90—91 to pivot as a unit as required during actuation of the platen 65 thereby as caused by the different elevations which the platen 65 may assume during the course of such actuation. The usual hydraulic tubing, connections and controls for actuating the piston 91 are not illustrated inasmuch as these are of known form, and it need only be pointed out that piston 91 is driven inwardly to elevate the platen 65 from the normal position shown in Fig. 2 to the solid line position shown in Fig. 3, either at a time when the press is to be loaded or when the press is to be emptied; conversely, the piston 91 is retracted when the die member 21 is to be closed off.

It is important that the advanced plane occupied by the die clamping faces of the upper platen 65 coincide precisionly to that of the upper face of the die member 21. As was mentioned, one factor of this is accurate dimension and orientation of the links 75 and the pivot pins associated therewith. Another way in which this can be conveniently accomplished is to interpose adjustable means between the ends of the links that are pivoted, and referring to Fig. 4A a modified link 75A in the form of a turnbuckle is shown as one form of adjustable link. A further advantage of this is that the depth of die space in the press can be changed as required in order to accommodate die members of different dimensions.

As another factor bearing on the foregoing, the present invention includes stop means for predetermining the aforesaid advanced plane of the platen 65. In other words, it is important under the present circumstances to eliminate as much wear as possible and to enable the platen 65 to be readily moved slightly from its advanced position as required when "bumping." In the present instance, such advantageous relations are assured by an adjustable stop in the form of a screw 105, Fig. 3, threadedly mounted in a nut 106 secured to the outer face of the left hand upright slab 48 as viewed in Fig. 3. As shown in Fig. 3, the inner end of the screw 105 is adapted to serve as a stop engageable with the left hand inner face IF of the upper platen 65 as viewed in this figure, and when the face IF is so engaged by the screw 105 the lower face of the wear plate 60 is disposed in the aforesaid advanced plane indicated at AP in Fig. 3.

When the platen 65 has been elevated, that is retracted as shown in Fig. 3 to dispose the lower face of the wear plate 60 in what can be termed the retracted plane RP, the die member 21 can be inserted into the die space of the press. After this has been accomplished, the piston 91 is then withdrawn to its normal position to produce relative closing movement between the paltens 65 and 66 to close off the individual die cavities 20. The next operation is to apply the pressure to the die member 21 which is required to cooperate with the heat generated in the space between the platens 65 and 66 to complete the cure of the brake lining pre-forms. Such cure pressure is generated by a ram 110, Fig. 8 which is secured to one end of a piston 111 adapted to be actuated by fluid in a cylinder 112. When the die member 21 is arranged in the die space of the press, the end block 30, Fig. 6, of the die member 21 engages the inner face of a wear plate 115, Fig. 2, secured to the inner face of the upright slab 48. Under such circumstances, the die plunger 31, Fig. 6, is adjacent the ram 110 so that the pressure exerted by the ram 110 causes the die member 21 to contract against and in the direction of the wear plate 115 which serves as a fixed reaction member for the die assembly at one end of the die cavity of the press. It will be further observed in Fig. 2 that the outer right hand ends of the wear plates 60 and 61 associated with the platens engage portions of the upper and lower face of the ram 110 when the ram 110 is in its retracted position shown in Fig. 2.

Because of the arcuate nature of the die elements 25, it is important that the ram 110 act with equal pressure throughout the area of the plunger 31 to assure that there will be no canting or whipsawing of the die elements 25 with consequent adverse distortion of the die cavities during contraction of the die elements 25. This accuracy of operation under the present invention is attained by affording guide means between the ram 110 and at least one of the platens 65. Thus, as best shown in Figs. 2 and 8, such guide means include end plates that are secured to opposite ends of the ram 110 so as to closely embrace complementally the opposed edges of the wear plate 61 of the lower platen 66 as shown in Fig. 5. By accurately machining the engaging faces of the respective guide members, it can be assured that the ram 110 will advance in a constantly parallel state.

The foregiong details of the invention are extremely important from a production standpoint. Brake linings of appreciable non-uniform cross section must necessarily be rejected as a production loss, and the cost of dies and platen wear plates can be excessive. In this latter connection, there is always some tendency for the pre-forms undergoing cure in the press to extrude, and this can cause adverse wear on the die member 21 and the platen wear plates. Accordingly, it is possible under the present invention, and preferred practice, to actually determine the aforementioned advanced plane AP of platen 65 as one spaced slightly from the upper face of the die member 21, say about 0.007" clearance. The stop 105 makes such desirable clearances possible and capable of adjustment to an optimum degree.

Hence, while a preferred form of the invention has been illustrated and described, it is to be understood that this is capable of variation and modification, and we therefore do not wish to be limited to the precise details set forth, but desire to avail ourselves of such changes and alterations as fall within the purview of the following claims.

We claim:

1. In a press of the kind described, a pair of vertically spaced apart platens adapted to define a die space therebetween, means affording a fixed reaction member in the press at one end of the die space, ram means acting in a horizontal direction and adapted to apply high pressure to a side of a die member arranged in said die space with the opposite side of the die member in contact with said reaction member, means mounting one of said platens for vertical movement along progressing parallel planes from a retracted plane to an advanced plane to close off a die space in such a die member in a direction substantially normal to that of said ram, piston and cylinder means adapted to actuate said moveable platen, said cylinder means being pivotally supported on a horizontal axis at one side of said press and said piston means acting in a horizontal direction and pivotally connected to one end of said moveable platen, and adjustable means to predetermine the advanced plane of said moveable platen.

2. In a press of the kind described, a pair of spaced apart platens adapted to define a die space therebetween, links mounting one of said platens for free swinging movement along progressing parallel planes from a retracted upper plane to an advanced lower plane to close off a die space in such a die member, a cylinder and piston for actuating said one platen, said cylinder being pivotally mounted on said press vertically and said piston being pivotally connected to said one platen, and adjustable means to predetermine the advanced plane of said one platen.

3. In a press of the kind described, a pair of vertically spaced apart platens adapted to define a die space therebetween and in which a die member is adapted to be inserted, means mounting one of said platens for vertical movement along progressing parallel planes from a retracted upper plane to an advanced lower plane to close off a die cavity in such a die member, and a cylinder and piston for actuating said one platen, said cylinder being pivotally mounted on a horizontal axis at one side of the press and said piston being pivotally connected to said one platen.

4. In a press of the kind described, a pair of vertically spaced apart platens adapted to define a die space therebetween and in which an expansible and contractable die member affording a plurality of arcuate die chambers having open upper and lower sides is adapted to be mounted, links mounting one of said platens for swinging movement along progressing parallel planes from a retracted upper plane spaced above said die member to an advanced lower plane to close off the upper sides of said die chambers in such a die member while the lower sides of said die chambers are closed off by the other of said platens, a cylinder and piston for actuating said one platen, said cylinder being pivotally mounted and said piston being pivotally connected to said one platen, ram means for applying pressure to said die member in a direction normal to the planes of movement of said one platen to exert substantial pressure on material arranged in said arcuate die chambers, said ram means and a part of the press adjacent said other platen affording engageable guide means to assure uniform action of said ram means on said die member producing uniform contraction of said arcuate die chambers, and means to predetermine the advanced plane of said one platen.

5. In a press of the kind described, a pair of vertically spaced apart platens having substantially flat horizontal pressure-applying faces normally defining in their spaced operative relation a die space of predetermined depth, said press including a fixed head and the upper one of said platens being supported below said head by links pivotally connected at the opposite ends thereof respectively to said upper platen and said head thereby allowing for free swinging movement of said upper platen in horizontal planes from an advanced lower plane to a retracted upper plane, mounting means affixed to the press, a fluid-pressure cylinder supported by said mounting means for pivoted vertical movement about a horizontal axis, said cylinder including piston means acting in a general horizontal direction, and said piston means being pivotally connected to one side of said upper platen for moving the upper platen in said horizontal planes in accordance with the flow of fluid under pressure in said cylinder.

6. A press according to claim 5 wherein said links are adjustable to accurately orient the pressure-applying face of the upper platen in a horizontal plane and wherein the press is provided with an adjustable stop to determine the advanced lower plane of said upper platen.

References Cited in the file of this patent

UNITED STATES PATENTS

| | | |
|---|---|---|
| 1,417,743 | Kempton | May 30, 1922 |
| 1,869,598 | Leguillon | Aug. 2, 1932 |
| 2,195,683 | Ross et al. | Apr. 2, 1940 |